United States Patent
Matsunaga et al.

(10) Patent No.: US 6,861,121 B2
(45) Date of Patent: Mar. 1, 2005

(54) OPTICAL DIFFUSING LAYER, OPTICAL DIFFUSING SHEET, AND OPTICAL ELEMENT

(75) Inventors: Takuya Matsunaga, Ibaraki (JP);
Hiroshi Shibata, Ibaraki (JP);
Takayuki Shigematsu, Ibaraki (JP);
Masayuki Satake, Ibaraki (JP);
Takashi Shouda, Ibaraki (JP)

(73) Assignee: Nitto Denko Corporation, Osaka (JP)

(*) Notice: Subject to any disclaimer, the term of this patent is extended or adjusted under 35 U.S.C. 154(b) by 0 days.

(21) Appl. No.: 10/029,721

(22) Filed: Dec. 20, 2001

(65) Prior Publication Data

US 2002/0142133 A1 Oct. 3, 2002

(30) Foreign Application Priority Data

Dec. 25, 2000 (JP) ......................... 2000-392255

(51) Int. Cl.$^7$ .............. B32B 5/16; B32B 7/02; G02B 1/11
(52) U.S. Cl. ............. 428/141; 428/147; 428/143; 428/212; 428/323; 428/327; 428/328; 428/1.3; 428/213; 428/913; 349/112; 359/599; 359/586; 359/580; 359/601; 359/615; 359/609
(58) Field of Search ................. 428/141, 147, 428/143, 212, 323, 327, 328, 113, 213, 913; 359/599, 586, 580, 601, 615, 609; 349/112

(56) References Cited

U.S. PATENT DOCUMENTS

| 5,387,463 | A | | 2/1995 | Nakamura et al. | |
| 5,770,306 | A | * | 6/1998 | Suzuki et al. | 428/328 |
| 6,064,524 | A | * | 5/2000 | Oka et al. | 359/582 |
| 6,528,142 | B2 | * | 3/2003 | Ikegaya et al. | 428/141 |
| 2002/0150722 | A1 | * | 10/2002 | Suzuki | 428/141 |

FOREIGN PATENT DOCUMENTS

| JP | 9-193332 | 7/1997 |
| JP | 9-193333 | 7/1997 |
| JP | 11-326611 | 11/1999 |
| JP | 2001-154006 | 6/2001 |

* cited by examiner

Primary Examiner—William P. Watkins, III
(74) Attorney, Agent, or Firm—Knobbe Martens Olson & Bear, LLP

(57) ABSTRACT

An optical diffusing layer comprising a resin coated layer having a surface fine concavo-convex structure, wherein an average of peak-to-peak distance (Sm), an average of center line surface roughness (Ra), and an average of ten-point surface roughness (Rz) on the surface with fine concavo-convex structure satisfy specified equations, is capable of maintaining antiglare property and screen glare simultaneously controlled, when applied to an LCD in which high definition is required.

16 Claims, 1 Drawing Sheet

OPTICAL DIFFUSING LAYER, OPTICAL DIFFUSING SHEET, AND OPTICAL ELEMENT

BACKGROUND OF THE INVENTION

1. Field of the Invention

The present invention relates to an optical diffusing layer used in order to suppress decrease in visibility of a screen, an optical diffusing sheet having the optical diffusing layer concerned thereon, and further relates to an optical element in which the optical diffusing sheet concerned is prepared thereon, in a liquid crystal display (LCD), organic EL, and PDP, etc.

2. Description of the Related Art

Conventionally, in picture display, such as LCD, incidence from an indoor lighting, such as a fluorescent light, or sunlight from windows, or a reflection of operator's shadow etc. given to a display unit surface sometimes aggravates visibility of pictures. Therefore an optical diffusing layer is provided, on LCD surface, in which fine concavo-convex structure is formed in order to diffuse a surface reflected light, to suppress a regular reflection of outdoor daylight and to prevent a reflection of outside environment (having antiglare property), for the purpose of improvement in the visibility of pictures. As a formation method of optical diffusing layer, a method is mainly used in which a resin layer is formed with a coated layer having a resin containing particles in dispersed state, because fine structure may be easily realized and at the same time excellent productivity may be realized by the method.

In the case where an LCD is required a high definition (for example, no less than 120 ppi), however, when this LCD is equipped with the above-mentioned optical diffusing layer, a portion appears on the LCD surface that has glare and a different strength of brightness by an effect of convex lens effect demonstrated by a fine concavo-convex structure formed with particles projected on the surface of the optical diffusing layer. Consequently, decrease in visibility may be caused.

A technical indication is disclosed, for example, in JP,9-193332,A and JP,9-193333,A that in order to solve such problems an average of peak-to-peak distance (Sm) of a surface with fine concavo-convex structure, and an average of center line surface roughness (Ra), etc are to be adjusted in a specified range. However, in the technology, even if a surface with fine concavo-convex structure is controlled to have the above-mentioned property in the specific range, a defect of glare cannot necessarily be efficiently inhibited.

SUMMARY OF THE INVENTION

An object of the present invention is to provide an optical diffusing layer in which antiglare property may be maintained and screen glare may be simultaneously controlled, when applied to an LCD in which high definition is required. Furthermore, another object of the present invention is to provide an optical diffusing sheet having the optical diffusing layer, and an optical element in which the optical diffusing sheet is prepared, and a visual display using the above-mentioned optical element.

As a result of wholehearted examination to solve the above-mentioned subject, the present inventors found out that the above-mentioned object is attained using an optical diffusing layer having a surface structure shown below to complete the present invention.

That is, the present invention relates to an optical diffusing layer comprising a resin coated layer having a surface fine concavo-convex structure, wherein an average of peak-to-peak distance (Sm), an average of center line surface roughness (Ra), and an average of ten-point surface roughness (Rz) on the surface with fine concavo-convex structure satisfy following equations:

$Sm <= 80\ \mu m$, $Ra <= 0.25\ \mu m$, and $Rz <= 9Ra$.

Glare on the surface of fine concavo-convex structure is considered to be caused by a lens effect mainly produced by a light with random strength induced by the surface concavo-convex structure. In the present invention, therefore, glare is suppressed by methods in which the average of peak-to-peak distance (Sm) is controlled to be no more than 80 $\mu m$ and the average of center line surface roughness (Ra) is no more than 0.25 $\mu m$, and glare is decreased further by controlling the average of ten-point surface roughness (Rz) as small as possible so that Rz/Ra might become no more than 9. When the average of center line surf roughness (Ra) becomes larger, the average of ten-point surface roughness (Rz) will also usually become larger, but in the present invention, screen glare is suppressed, because the average of ten-point surface roughness (Rz) is controlled smaller as compared with the average of center line surface roughness (Ra), and a convex structure is arranged to have the same form. When the above-mentioned values go out of the above-mentioned predetermined ranges, screen glare is increased.

The peak-to-peak distance (Sm) is preferably no more than 70 $\mu m$ and more preferably from 40 to 60 g m. Moreover, the average of center line surface roughness (Ra) is preferably no more than 0.2 $\mu m$, and more preferably from 0.1 to 0.17 $\mu m$. And the average of ten-point suit roughness (Rz) is preferably about from 1 to 1.5 $\mu m$. Furthermore, RZ/Ra, is preferably no more than 7.5.

In the above-mentioned optical diffusing layer, it is preferable that 60° glossiness of the surface with fine concavo-convex structure is no more than 70%. A reflection is prevented and an antiglare property is developed by controlling the above-mentioned 60° glossiness into no more than 70%. The above-mentioned 60° glossiness is preferably no more than 60% and more preferably 40%–50%.

In the above-mentioned optical diffusing layer, it is preferable that the resin coated layer contains particles and that the surface concavo-convex structure of resin coated layer is formed with the particles. Moreover, particles contained in resin coated layer are preferably organic particles. Furthermore, it is preferable that the resin coated layer is formed by the ultraviolet curable resin.

A resin coated layer having a surface concavo-convex structure are easily and certainly realized and controlling of the above-mentioned average of center line surface roughness (Ra), average of peak-to-peak distance (Sm), and average of ten-point surface roughness (Rz) is easily realized by using particles. It is especial effective to use organic particles as particles in order to suppress screen glare. Moreover, when the ultraviolet curable resin is used, curing processing by ultraviolet rays irradiation may be applied, and a resin coated layer (optical diffusing layer) may be efficiently formed with easy processing operation.

Moreover, the present invention relates to the optical diffusing layer, further comprising a low refractive index layer having a refractive index lower than a refractive index of the resin coated layer disposed on concavo-convex structure surface of the resin coated layer that constitutes the above-mentioned optical diffusing layer. Antireflection function is given by this low refractive index layer to the optical diffusing layer and as a result a decrease in visibility of a black display of a screen, that is, so-called "white ghost" is suppressed effectively that is caused by an irregular reflection on a surface of a picture, such as a display.

Moreover, the present invention relates to an optical diffusing sheet comprising the abovementioned optical diffusing layer disposed on one side or on both sides of a transparent substrate. And the present invention relates to an optical element comprising the above-mentioned optical diffusing layer or the above-mentioned optical diffusing sheet disposed on one side or on both sides of an optical element, and a visual display applying the above-mentioned optical element.

An optical diffusing layer of the present invention may be used for various kinds of uses, for example, for an optical element as an optical diffusing sheet prepared on a transparent plate.

DETAILED DESCRIPTION OF THE PREFERRED EMBODIMENTS

Figure 1:
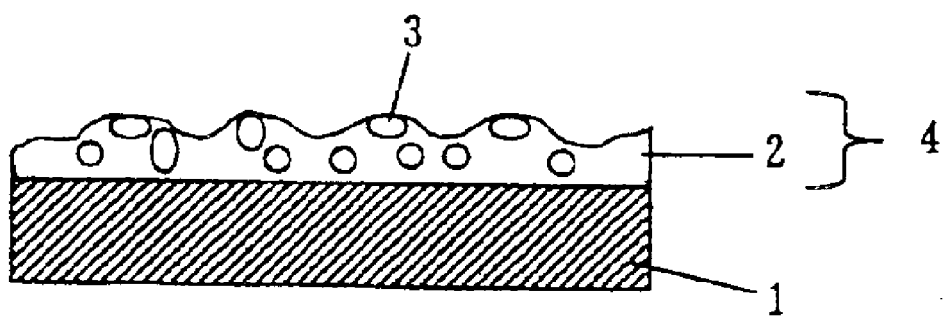
FIG. 1 shows an example of sectional view of an optical diffusing sheet of this invention.

Preferred embodiment of the invention will be described below, referring to a drawing.

FIG. 1 shows an optical diffusing sheet in which an optical diffusing layer 4 consisting of a resin coated layer 2 with particles 3 dispersed therein !2, is formed on a transparent plate 1, and particles 3 currently dispersed in the resin coated layer 2 form concavo-convex structure on a sure of the optical diffusing layer 4. In addition, although a case where one resin coated layer 2 is prepared is shown in FIG. 1, an optical diffusing layer may be formed with two or more resin coated layers by forming the resin coated layer containing particles separately between a resin coated layer 2 and a transparent plate 1.

The transparent plate 1 may be a film made of a transparent polymer. Examples of the polymers for forming the transparent plate 1 include polyester series polymers such as poly ethylene terephthalate and poly ethylene naphthalate; cellulosic series polymers such as diacetylcellulose and triacetylcellulose; polycarbonate series polymers; acryl series polymers such as poly methyl methacrylate; styrene series polymers such as polystyrene and acrylonitrile-styrene copolymer; olefinic series polymers such as polyethylene, polypropylene, cyclo-type polyolefins, polyolefins having a norbornene structure, and ethylene-propylene copolymer; vinyl chloride series polymers; amide series polymers such as nylon and aromatic polyamides; imide series polymers; sulfone series polymers; polyether sulfone series polymers; polyetheretherketone series polymers; polyphenylene sulfide series polymers; vinylalcohol series polymers; vinylidene chloride series polymers; vinyl butyral series polymers; allylate series polymers; polyoxymethylene series polymers; epoxy series polymers; and blends of the above-mentioned polymers.

The thickness of the transparent plate 1 may be appropriately determined and is typically from about 10 to about 500 $\mu$m from the standpoints of the strength, the workability such as a handling property, and the layer thinness. The thickness of the transparent substrate 1 is preferably from 20 to 300 $\mu$m, more preferably from 30 to 200 $\mu$m.

If the resin coated layer 2 that has fine concavo-convex structure surface is formed on the transparent plate 1, especially a formation method is not limited but a proper formation method may be adopted. For example, a method may be mentioned in which the fine concavo-convex structure is formed on the surface itself of a material forming the resin coated layer 2, using a method in which the surface of a film used for formation of the above-mentioned resin coated layer 2 is treated to be rough by proper methods, such as sandblasting, and emboss rolling, chemical etching beforehand, and the fine concavo-convex structure is given to the film surface. Moreover, a method may be mentioned in which the resin coated layer is added on the resin coated layer 2 separately, and then the fine concavo-convex structure is given by a transferring method by a metal mold etc. on the resin coated layer surface. Furthermore, as shown in FIG. 1, a method may be mentioned in which the resin coated layer 2 is made to contain particles 3 in a dispersed state to give the fine concavo-convex structure etc. In these formation methods of the fine concavo-convex structure, two or more kinds of methods may be used in combination to form a layer as layers comprising a plurality of compound fine concavo-convex structure surfaces. Especially in the above-mentioned formation methods of said resin coated layer 2, a method is preferable in which particles 3 are contained in a dispersed state to form the resin coated layer 2 because a formation of the surface of the fine concavo-convex structure may be carried out easily and properly.

Hereinafter, a description about a method will be given in which particles 3 are contained in the dispersed state to form the resin coated layer 2. As a resin that forms the resin coated layer 2 concerned, the resin that has a dispersibility for particles 3, that has a strength sufficient as a film after resin coated layer is formed, and that has transparency may be especially used without any limitation. Although thermosetting resin, thermoplastic resins, ultraviolet curable resins, electron beam curable resin, resins of two-component mixing type, etc. may be mentioned as the above-mentioned resins, in these resins, the ultraviolet curable resin is preferable because a simple processing operation may be applied and the optical diffusing layer may be efficiently formed by an ultraviolet rays irradiation.

The ultraviolet curable resin may be one of a variety of resins including polyester series resins, acryl series resins, urethane-series resins, amide series resins, silicone series resins, and epoxy series resins, and may be a monomer, an oligomer, a polymer, or the like of ultraviolet curable. A preferably used ultraviolet curable resin may be, for example, one having an ultraviolet-polymerizing functional group, in particular, one containing an acryl series monomer or oligomer having two or more ultraviolet-polymerizing functional groups, particularly from 3 to 6 of such functional groups, as a component. The ultraviolet curable resin may contain an ultraviolet polymerization initiator.

In addition, additives, such as leveling agents, thixotropic agents, and antistatic additives, may be added in formation of the resin coated layer 2. When the resin coated layer is formed, the fine concavo-convex structure projected on the surface by particles may be easily formed on the surface of the resin coated layer (optical diffusing layer) by a method in which thixotropic agents (silica or mica of no more than 0.1 $\mu$m etc.) are contained.

As particles 3, particles that have transparency, such as various metal oxides, glasses, and plastics, may be used without special limitation. For example, inorganic particles that may show conductivity, such as silica, alumina, titania, zirconia, calcium oxide, tin oxide, indium oxide, cadmium oxide, and antimony oxide; or cross lined or non-cross linked particles comprising various polymers, such as poly methylmethacrylates, polystyrenes, polyurethanes, acrylic-styrene copolymers, benzoguanamine, melamines, and polycarbonates; and silicone series particles, etc. may be mentioned. As these particles 3, one kind or two or more kinds may be selected and used suitably, and or particles are preferable. An average of particle size is from 1 to 10 $\mu$m and preferably from 2 to 5 $\mu$m.

Manufacturing methods of the above-mentioned optical diffusing sheet are not especially limited, but proper methods may be used. For example, a resin (for example, ultraviolet curable resin: coating liquid) that contains particles 3 is coated on the above-mentioned transparent plate 1, subsequently cure processing is carried out after dried, and then an optical diffusing layer 4 is formed by the resin coated layer 2 that gives concavo-convex structure to a surface. In addition, coating liquids are coated using proper methods, such as fountain, die coater, casting, spin coating, fountain metalling, and photogravure etc.

On the surface of the firmed optical diffusing layer 4, in order to set an average of peak-to-peak distance (Sm), an average of center line surface roughness (Ra), and an average of ten-point surface roughness (Rz) in a predetermined range, an average particle size and a percentage of particles 3 contained in the above-mentioned coating liquid and a thickness of a resin coated layer 2 are suitably adjusted.

A percentage of particles 3 contained in the above-mentioned coating liquid is not especially limited, in order to suppress screen glare, the percentage is preferably 6–20 weight parts to resin 100 weight parts. Moreover, although a thickness of a resin coated layer 2 is not especially limited, the thickness is about from 3 to 6 $\mu$m, and preferably about from 4 to 5 $\mu$m.

A low refractive index layer with antireflection function may be prepared on the concavo-convex structure surface of a resin coated layer 2 that forms the above-mentioned optical diffusing layer 4. If a material has a refractive index lower than a refractive index of a resin coated layer 2, a kind of the material of low refractive index layer is not especially limited, and, for example, low refractive index materials, such as fluorinated polysiloxanes, may be used for it. A thickness of a low refractive index layer is not especially limited, and is about form 0.05 to 0.3 $\mu$m, and preferably from 0.1 to 0.3 $\mu$m.

Furthermore, an optical element (not illustrated) may be attached to the optical diffusing sheet of FIG. 1. The optical element may be, for example, a polarizing plate or a retardation plate, and these may be used as a laminate. The optical element can be attached via a suitable adhesive layer, which is excellent in transparency and weathering resistance, such as an acryl series, rubber series, or silicone series adhesive or a hotmelt-type adhesive, in accordance with the needs.

A polarization plate is used for an optical film applied to visual display, such as a liquid crystal display. Polarizing plate usually has protective films on one side or both sides of a polarizer. The transparent plat 1 of the optical diffusing sheet is used as the protective film. A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol series film, partially formalized polyvinyl alcohol series film, and ethylene-vinyl acetate copolymer series partially saponified film; poly-ene series alignment films, such as dehydrated polyvinyl alcohol and dehydrochlorinated polyvinyl chloride, etc. may be mentioned. In these, a polyvinyl alcohol series film on which dichromatic materials (iodine, dyes) is absorbed and aligned after stretched is suitably used. Although thickness of polarizer is not especially limited, the thickness of about 5 to 80 $\mu$m is commonly adopted.

A polarizer that is uniaxially stretched after a polyvinyl alcohol series film dyed with iodine is obtained by stretching a polyvinyl alcohol film by 3 to 7 times the original length, after dipped and dyed in aqueous solution of iodine. The film may also be dipped in aqueous solutions, such as boric acid and potassium iodide, if needed. Furthermore, before dyeing, the polyvinyl alcohol series film may be dipped in water and rinsed if needed. By rinsing polyvinyl alcohol series film with water, effect of preventing un-uniformity, such as unevenness of dyeing, is expected by making polyvinyl alcohol series film swelled in addition that also soils and blocking inhibitors on the polyvinyl alcohol series film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a protective film prepared in one side or both sides of the above-mentioned polarizer, materials with outstanding transparency, mechanical strength, heat stability, moisture cover property, isotropy, etc. may be preferable. As materials of the above-mentioned protective film, for example, polyester series polymers, such as polyethylene terephthalate and polyethylenenaphthalate; cellulose series polymers, such as diacetyl cellulose and triacetyl cellulose; acrylics series polymer, such as poly methylmethacrylate; styrene series polymers, such as polystyrene and acrylonitrile-styrene copolymer (AS resin); polycarbonate series polymer may be mentioned. Besides, as examples of the polymer forming a protective film, polyolefin series polymers, such as polyethylene, polypropylene, polyolefin that has cyclo-type or norbornene structure, ethylene-propylene copolymer; vinyl chloride series polymer; amide series polymers, such as nylon and aromatic polyamide; imide series polymers; sulfone series polymers; polyether sulfone series polymers; polyether-ether ketone series polymers; poly phenylene sulfide series polymers; vinyl alcohol series polymer, vinylidene chloride series polymers; vinyl butyral series polymers; allylate series polymers; polyoxymethylene series polymers; epoxy series polymers; or blend polymers of the above-mentioned polymers may be mentioned. In addition, a film comprising resins of heat curing type or ultraviolet curing type, such as acrylics series, urethane series, acrylics urethane series and epoxy series and silicone series series may be mentioned. Generally, thickness of the protective film is no more than 500 $\mu$m, preferably 1 to 300 $\mu$m and more preferably 5 to 200 $\mu$m.

As a protective film, cellulose series polymers, such as triacetyl cellulose, is preferable by reason of polarization characteristics and durability etc. Especially triacetyl cellulose film is preferable. In addition, when protective film is prepared on both sides of the polarizer, the protective film consisting of the same polymer material may be used on the front and the backside, or the protective films consisting of different polymer materials etc. may be used. The above-mentioned polarizer and the protective film are usually adhered via an aqueous pressure sensitive adhesive etc. As an aqueous pressure sensitive adhesive, polyvinyl alcohol series adhesives, gelatin series adhesives, vinyl series latex, series adhesives, aqueous polyurethane adhesives, aqueous polyester adhesives, etc. may be mentioned.

As the above-mentioned protective film, a film with a hard coat layer and various processing aiming for antireflection, or sticking prevention may be used.

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable series resins, such as acrylic series and silicone series resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, the above-mentioned antireflection layer, sticking prevention layer etc. may be built in the protective film itself, and also they may be prepared as an optical layer different from the protective layer.

The above-mentioned polarization plate may be used as elliptically polarization plate or circularly polarization plate on which the retardation plate is laminated. A description of the above-mentioned elliptically polarization plate or circularly polarization plate will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarization plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection.

For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned.

Besides, the above-mentioned retardation plates is laminated onto polarization plate as a viewing angle compensating film to be used as a wide viewing angle polarization plate. A viewing angle compensating film is a film for extending viewing angle so that a picture may look comparatively clearly, even when it is viewed from an oblique direction not from vertical direction to a screen.

As such a viewing angle compensating retardation plate, in addition, a film having birefringence property that is processed by uniaxial stretching or orthogonal bidirectional stretching and a bidriectionally stretched film as tilted orientation film etc. may be used. As tilted orientation film, for example, a mm obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensating film is suitably combined for the purpose of prevention of coloring caused by change of visible angle based on retardation by liquid crystal cell etc. and of expansion of viewing angle with good visibility.

Besides, a compensating plate in which an optical anisotropy layer consisting of an alignment layer of liquid crystal polymer, especially consisting of a tilted alignment layer of discotic liquid crystal polymer is supported with triacetyl cellulose film may preferably be used from a viewpoint of attaining a wide viewing angle with good visibility.

Besides, although there is especially no limitation about an optical layer laminated in practical use, for example, one or more optical layers that may be used for formation of liquid crystal display, such as a reflection plate and a semitransparent plate, etc. may be used. Especially, a reflection type polarization plate or a semitransparent type polarization plate in which a reflection plate or a semitransparent reflector is further laminated on an elliptically polarization plate or a circularly polarization plate, or a polarization plate in which a brightness enhanced film is further laminated on the polarization plate may be mentioned.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the sure obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a semitransparent type polarizing plate may be obtained by preparing the above-mentioned reflective layer as a semitransparent type reflective layer, such as a half-mirror etc. that reflects and transmits light. A semitransparent type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a semitransparent type polarization plate. That is, the semitransparent type polarization plate is useful to obtain of a liquid crystal display of the type that saves energy of light sources, such as a back light, in a well-lighted atmosphere, and can be used with a built-in light source if needed in a comparatively dark atmosphere etc.

The polarization plate with which a polarization plate and a brightness enhanced film are adhered together is usually used being prepared in a backside of a liquid crystal cell. A brightness enhanced film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhanced film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhanced film further reversed through the reflective layer prepared in the backside and forces the light re-enter into the brightness enhanced film, and increases the quantity of the transmitted light through the brightness enhanced film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhanced film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhanced film does not enter the light with the polarizing direction absorbed by the polarizer into the polarizer but reflects the light once by the brightness enhanced film, and further makes the light reversed through the reflective layer etc. prepared in the backside to re-enter the light into the brightness enhanced film. By this above-mentioned repeated operation, only when the polarization direction of the light reflected and reversed between the both becomes to have the polarization direction which may pass a polarizer, the brightness enhanced film transmits the light to supply it to the polarizer. As a result, the light from a backlight may be efficiently used for the display of the picture of a liquid crystal display to obtain a bright screen.

The suitable films are used as the above-mentioned brightness enhanced film. Namely, multilayer thin film of a dielectric substance; a laminated film that has the characteristics of transmitting a linearly polarized light with a predetermined polarization axis, and of reflecting other light, such as the multilayer laminated film of the thin film having a different refractive-index anisotropy; an aligned film of cholesteric liquid-crystal polymer, a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhanced film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhanced film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhanced film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a semitransparent type polarization plate is combined with above described retardation plate respectively.

The above-mentioned elliptically polarization plate and an above-mentioned reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

A pressure sensitive adhesive layer may also be prepared in an optical film of the present invention. A pressure sensitive adhesive layer may be used for attachment to liquid crystal cell, and also for laminating of an optical layer. In adhesion of the above-mentioned optical film, those optical axes may be adjusted so that they may give suitable configuration angle according to a desired retardation characteristics.

As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusing nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarization plate top or a optical film top using suitable developing methods, such as flow method and coating method, or a method in which an adhesive layer is once formed on a separator, as mentioned above, and is then transferred on a polarization plate or an optical film may be mentioned.

An adhesive layer may also be prepared on one side or both sides of a polarization plate or an optical film as a layer in which pressure sensitive adhesives with different composition or different kind etc. are laminated together. Moreover, when adhesive layers are prepared on both sides adhesive layers that have different compositions, different kinds or thickness, etc. may also be used on front side and backside of a polarization plate or an optical film. Thickness of an adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of an adhesive layer to prevent contamination etc., until it is practically used. Thereby, it can be prevented that foreign matter contacts adhesive layer in usual handling. As a separator, without talking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarization plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, λ type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusing plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg-Ag and Al-Li are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to $\lambda/4$, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

Hereafter description in detail about the present invention will be given below using examples, this invention is not limited at all by these Examples.

Example 1

As particles, polystyrene beads having an average particle size of 3.5 $\mu$m 12 weight parts, a ultraviolet curable resin (urethane acrylate series monomer) 100 weight parts, and a benzophenone derived photo polymerization initiator 5 weight parts were dissolved in solvent (toluene) to obtain a solution with solid content of 40%. After the solution obtained was coated on a triacetyl cellulose, dried at 120° C. for five minutes, the coated layer obtained was cured with ultraviolet irradiation. Thus an optical diffusing sheet having a resin coated layer with a surface of fine concavo-convex structure having a thickness of about 4 $\mu$m was produced Example 2

In example 1, an optical diffusing sheet was produced as in example 1 except having changed the amount of polystyrene beads used into 14 weight parts.

Example 3

In example 1, an optical diffusing sheet was produced as in example 1 except having changed thickness of a resin coated layer into about 3 $\mu$m.

Example 4

In example 2, an optical diffusing sheet was produced as in example 1 except that a low refractive index layer (material: fluorine modified polysiloxane, refractive index: 1.39) having a refractive index lower than a index (1.51) of the above-mentioned resin coated layer might have thickness of 0.1 $\mu$m, was formed to the concavo-convex structure surface of the resin coated layer.

Comparative Example 1

In example 1, an optical diffusing sheet was produced as in example 1 except having changed polystyrene beads having an average particle size 3.5 $\mu$m 14 weight parts into silica beads having an average particle size from 2 to 3 $\mu$m 14 weight parts.

Comparative Example 2

In example 1, an optical diffusing sheet was produced as in example 1 except having changed a thickness of the resin coated layer into about 2.5 μm.

Comparative Example 3

In example 1, an optical diffusing sheet was produced as in example 1 except having changed the amount of polystyrene beads used into 10 weight parts, and having changed a thickness of the resin coated layer into about 2.5 μm.

A form of a sure concavo-convex structure of optical diffusing sheets obtained by the above-mentioned examples and comparative examples is measured according to JIS B0601, using Sirfcom 470A by Tokyo Seimitsu Co., Ltd. as a stylus method type surface roughness measurement machine. In addition, in measurement, a length of 3 mm on concavo-convex face is scanned in the fixed direction via a measurement needle with a diameter of 1 mm, with which a tip nose with vertex angle of 55 degrees of a circular cone consisting of diamond. Thus, measurement is performed by obtaining a transfer change of the measurement needle in a vertical direction. From a surface roughness curve that recorded a transfer change, an average of peak-to-peak distance (Sm), an average of center line surf surface roughness (Ra), and an average of ten-point surf roughness (Rz) were calculated. Moreover, 60 glossiness was measured using digital variable glossimeter UGV-5DP made by Suga Testing Machine Co., according to JIS K 71051981. Result is shown in table 1. Polarization plate (185 μm) was adhered to each of the optical diffusing sheets obtained by the abovementioned examples and comparative examples, and glass substrate was further adhered. These laminated materials were evaluated in glare degree (screen glare) by viewing on a mask pattern (open area ratio 25%) fixed on a light table based on the following criteria. Result is shown in table 1. In addition, each sample showed reasonable reflection under fluorescent light (antiglare property).

(Glare)
◉ no glare
○ a little glare
Δ a little glare with practically no problem
x glare

TABLE 1

| | Sm (μm) | Rz (μm) | Ra (μm) | Rz/Ra | 60 glossiness (%) | Glare |
|---|---|---|---|---|---|---|
| Example 1 | 60.0 | 1.28 | 0.15 | 8.57 | 60.0 | ◉ |
| Example 2 | 48.9 | 0.86 | 0.12 | 7.16 | 58.4 | ◉ |
| Example 3 | 35.0 | 1.56 | 0.24 | 6.50 | 30.0 | ○ |
| Example 4 | 51.7 | 1.56 | 0.22 | 7.09 | 35.6 | ○ |
| Comparative Example 1 | 47.7 | 2.62 | 0.34 | 7.71 | 52.0 | X |
| Comparative Example 2 | 37.4 | 1.74 | 0.28 | 6.21 | 25.8 | X |
| Comparative Example 3 | 54.2 | 1.48 | 0.16 | 9.25 | 42.0 | X |

(Glare)
◉ no glare
○ a little glare
Δ a little glare with practically no problem
X glare

What is claimed is:

1. An optical diffusing layer comprising a resin coated layer having a surface fine concavo-convex structure which is formed by particles having a particle size of 2 to 5 μm, wherein an average of peak-to-peak distance (Sm), an average of center line surface roughness (Ra), and an average of ten-point surface roughness (Rz) on the surface with fine concavo-convex structure satisfy following equations:

$$Sm \leq 80 \, \mu m,$$
$$0.1 \leq Ra \leq 0.17 \, \mu m, \text{ and}$$
$$Rz \leq 9Ra,$$

said optical diffusing layer further comprising a low refractive index layer having a refractive index lower than a refractive index of the resin coated layer disposed on the concavo-convex structure surface of the resin coated layer.

2. The optical diffusing layer according to claim 1, wherein a 60° glossiness of the surface with fine concavo-convex structure is no more than 70%.

3. The optical diffusing layer according to claim 1, wherein the particles are organic particles.

4. The optical diffusing layer according to claim 1, wherein the resin coated layer is formed by an ultraviolet curable resin.

5. An optical diffusing sheet comprising the optical diffusing layer of claim 1 disposed on one side or on both sides of a transparent substrate.

6. An optical element comprising the optical diffusing layer of claim 1 disposed on one side or on both sides of an optical element.

7. A visual display applying the optical element according to claim 6.

8. An anti-glare outermost layer; comprising a resin and particles having a particle size of 2 to 5 μm dispersing therein, said outermost layer having a concave-convex surface having the following profiles:

$$Sm \leq 80 \, \mu m;$$
$$0.1 \leq Ra \leq 0.17 \, \mu m; \text{ and}$$
$$Rz \leq 9 \cdot Ra,$$

wherein Sm is an average of peak-to-peak distance, Ra is an average of center line surface roughness, and Rz is an average of ten-point surface roughness, said anti-glare outermost layer further comprising a low refractive index layer having a refractive index lower than a refractive index of the anti-glare outermost layer, said index layer being disposed on the concave-convex surface of the anti-glare outermost layer.

9. The anti-glare outermost layer according to claim 8, which is a layer coated on a transparent plate.

10. The anti-glare outermost layer according to claim 8, wherein the profiles are achieved by selecting the type of particles, a size of the particles, an amount of the particles, and a thickness of the layer.

11. An optical element comprising the optical diffusing sheet of claim 5 disposed on one side or on both sides of an optical element.

12. A visual display applying the optical element according to claim 11.

13. The optical diffusing layer according to claim 1, wherein the low refractive layer comprises fluorinated polysiloxanes.

14. The optical diffusing layer according to claim 1, wherein the low refractive layer has a thickness of about 0.05 μm to about 0.3 μm.

15. The anti-glare outermost layer according to claim 8, wherein the low refractive layer comprises fluorinated polysiloxanes.

16. The anti-glare outermost layer according to claim 8, wherein the low refractive layer has a thickness of about 0.05 μm to about 0.3 μm.

* * * * *